May 30, 1961  F. N. SPIESS  2,986,036
METHOD AND APPARATUS FOR MEASURING ACCELERATIONS IN THE OCEAN
Filed Dec. 7, 1956  2 Sheets-Sheet 2

F. N. SPIESS  INVENTOR.

United States Patent Office 2,986,036
Patented May 30, 1961

2,986,036
METHOD AND APPARATUS FOR MEASURING ACCELERATIONS IN THE OCEAN
Fred N. Spiess, La Jolla, Calif., assignor to The Regents of the University of California, a corporation of California Filed Dec. 7, 1956, Ser. No. 627,043

4 Claims. (Cl. 73—382)

This invention relates to the accurate measurement of the acceleration of gravity, in particular to such measurements on the deep ocean, and to the measurements of acceleration fluctuations of water masses in the ocean.

This invention makes possible the accurate measurement of gravity at sea, in spite of large fluctuating accelerations which often extend to depths of several hundred feet, using equipment which can be operated from any type of ship or slow moving aircraft. Two types of devices have previously been used to make accurate gravity measurements at sea. Both of these require the use of a submarine to carry the equipment and operator to depths greater than 100 feet. The remaining fluctuating accelerations of the instrument are then measured, in each case, by use of special auxiliary long period pendulums. Corrections for these fluctuations are then either fed back electrically to the primary measuring apparatus or are calculated and applied mathematically to the final result. The invention described herein, however, eliminates both the necessity for use of the submarine and for the use of the auxiliary measuring equipment and corrections.

The new equipment consists of a sensitive accelerometer and an accurate depth gage in a neutrally buoyant pressure proof case connected to the ship by a long flexible wire which is kept slack during the measurement. The instrument can be operated at any depth greater than 50 feet. In this way the sensing element can be operated to measure gravity at a depth of 500 to 1,500 feet where the disturbing action of the surface waves produces a negligible effect. The slack wire is used for retrieving the instrument and allows power to be sent down to the equipment and the signal to be sent back up to any sort of craft all without the motion of the carrying vessel affecting the readings of the accelerometer.

The object of the invention is to provide a system which can be used to measure the acceleration of gravity accurately in the ocean without necessity for use of a submarine or for complicated auxiliary devices to overcome the effects of disturbing accelerations of the instrument.

Another object of this invention is to measure the fluctuating accelerations of the water from depths of 50 feet on down in the ocean.

Figure 1:
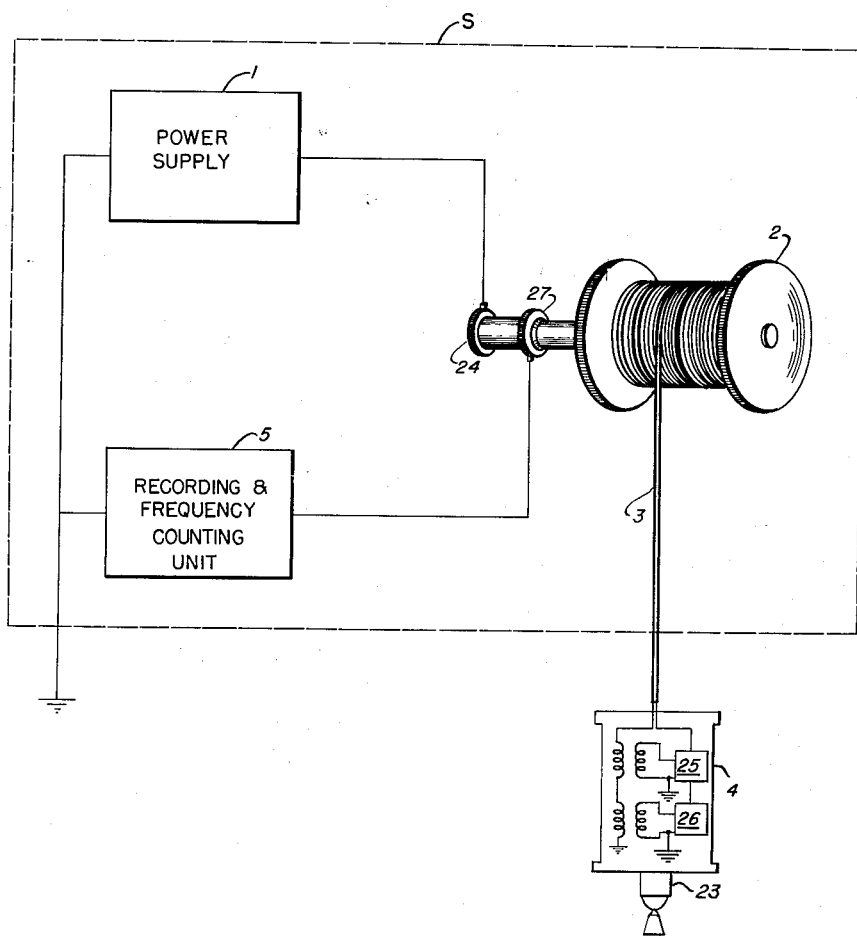
Figure 2:
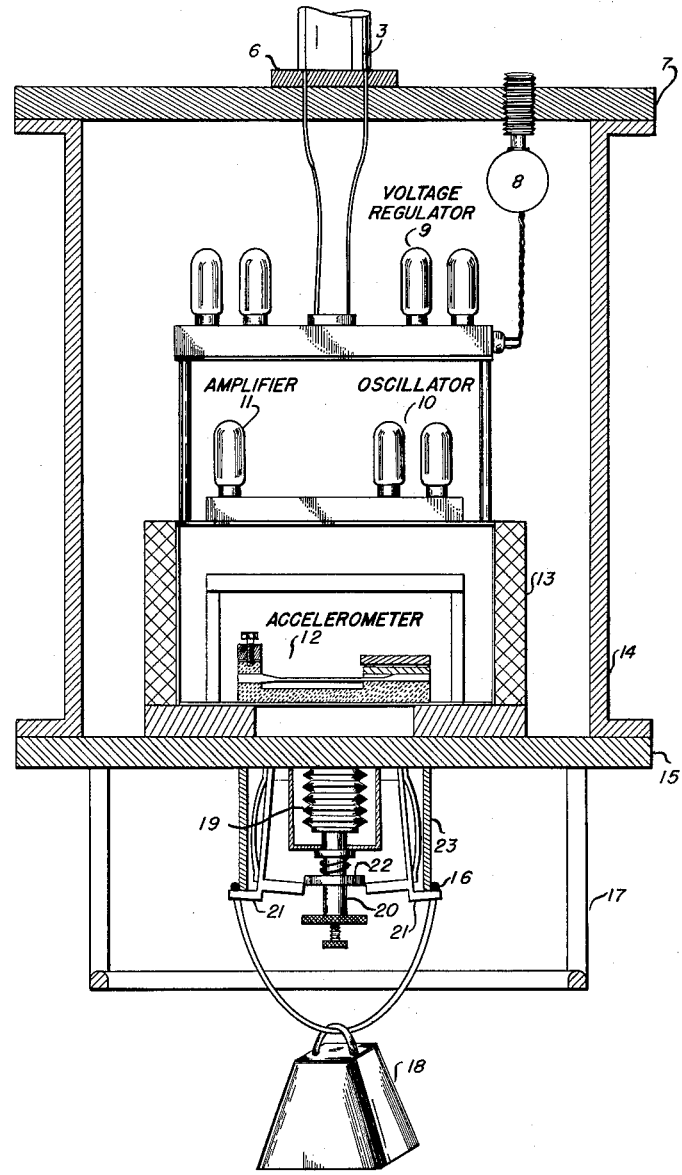

Figure 1 shows a schematic diagram of the necessary parts of a system which accomplishes these objects. Figure 2 is a section through the sensing unit.

The equipment on the ship indicated by a box S, consists of a well-regulated direct current power supply 1 of which one terminal is connected to a slip ring 24 on the winch 2 and the other terminal is connected to the ocean. In this way one of the conductors in the slack two-conductor wire 3 carries the necessary power to the sensing unit 4 and the ocean provides the grounded return path. Similarly the signals from the accelerometer 25 and depth gage 26 are combined in the sensing unit 4 and sent up the other wire, through the other slip ring 27 on the winch 2 to the recording and frequency counting unit 5, again with the sea acting as the return electrical path. It is necessary that the wire 3 be several thousand feet long and quite flexible.

The essential portion of the sensing unit is the acceleration controlled oscillator 25 in which the acceleration experienced by the meter directly alters the capacity of three condensers simultaneously. The condensers are used in a phase shift oscillator in such fashion that the output frequency is linearly related to the acceleration. This entire unit is fully described in the copending application of Fred N. Spiess for "Frequency Modulating Accelerometer," Serial No. 627,044, filed December 7, 1956, now Patent No. 2,917,300.

The wire 3 enters the sensing unit through a pressure proof packing gland 6. The power is fed to the filaments of the vacuum tubes in the various components and to a voltage regulator 9 which in turn provides plate supply voltage to the oscillator 10 and the amplifier 11. The accelerometer 12 is mounted in the thermostated case 13 and its deflection is used to control the frequency of the accelerometer oscillator 10. The signal from the oscillator is amplified at 11 and transformer coupled into the signal wire 3 as is the electrical output of the depth gage 8 thus combining the signals for transmission on one wire. The depth gage used is of the Vibrotron type (manufactured by the Byron Jackson Company) in which the output frequency varies proportionally with the depth. Plates 7 and 15 are the closures for the ends of the cylindrical pressure proof case 14 in which these elements are housed.

The weight dropper is composed of an air-filled metal bellows 19 to which the plunger 20 is attached. The two arms 21 are prevented from swinging inward by the shoulder 22. The ring 23 to which the weight 18 is attached is supported on the tabs at the ends of the arms 21, the arms in turn being prevented from swinging inward by the shoulder on the plunger. As the sea pressure on the outside of the bellows increases, the plunger moves upward until the shoulders can no longer keep the arms apart. At this pressure, the arms 21 swing inward suddenly releasing the ring 23 and weight 18 which drop off, leaving the case approximately neutrally buoyant and at the depth at which the measurements are to be made. The guard ring 17 protects the weight dropper and serves as a stand upon which the instrument may rest.

To make a measurement one attaches the weight 18 to the sensing unit 4, sets the dropper 16 and lowers the sensing unit 4 into the sea, paying out the wire 3 rapidly from the winch 2. At the pre-set depth the weight 18 is dropped and the sensing unit 4 hovers. The depth of the unit as measured by the gage 8 is recorded continuously at 5 as is the frequency from the accelerometer oscillator 10. In addition, when an accurate average value of acceleration is being determined the cycles of the accelerometer oscillator are counted over a period of several minutes using a Hewlett Packard or similar frequency counter 5. The sensing unit is then retrieved by winding in the wire 3 on the winch 2. Using the calibration of the accelerometer and correcting for the change in depth during the period of averaging the value of the force of gravity can be determined.

What is claimed is:

1. In a system for measuring the force of gravity at sea, the combination of submersible means including an oscillator and means responsive to the force of gravity for controlling the frequency of said oscillator, cable means connecting said submersible means to a vessel at the surface of the sea and having sufficient slack and flexibility to prevent spurious forces acting on said submersible means, means responsive to the pressure of the surrounding water for rendering said submersible means neutrally buoyant at a predetermined depth of submergence, means responsive to the pressure of the surrounding water for producing a signal indicative of the depth of the submersible means, means for combining said oscillations and said signal for transmission over said cable means, means on said vessel for recording said oscillations and said signal, and means on the vessel for counting the cycles of said oscillations.

2. A system for use in association with a vessel for measuring the force of gravity at sea, comprising; a submersible means including means for forming a signal representative of the force of gravity; means for rendering said submersible means neutrally buoyant at a predetermined depth comprising a pressure-sensitive means and a release mechanism controlled by said pressure-sensitive means whereby a weight is released by said release mechanism upon said pressure-sensitive means sensing a predetermined depth; indicating means located on said vessel for manifesting said signal; and means for transmitting said signal from said submersible means to said indicating means.

3. A system for use in association with a vessel for measuring the force of gravity at sea comprising; a submersible means including means for forming a signal representative of the force of gravity; a weight releasably carried by said submersible means; means for releasing said weight at a predetermined depth for rendering said submersible means neutrally buoyant; indicating means located on said vessel for manifesting said signal; and means for transmitting said signal from said submersible means to said indicating means.

4. A system for use in association with a craft at or above the surface of the sea for measuring the force of gravity at sea comprising: a submersible means including means responsive to the force of gravity for generating a signal representative of the force of gravity; means carried by said submersible means and responsive to the pressure of the surrounding water for rendering said submersible means neutrally buoyant at a predetermined depth; indicating means located on said vessel for manifesting said signal; and means for transmitting said signal from said submersible means to said indicating means.

References Cited in the file of this patent

UNITED STATES PATENTS

| | | |
|---|---|---|
| 2,589,710 | LaCoste | Mar. 18, 1952 |
| 2,595,092 | Mounce | Apr. 29, 1952 |
| 2,634,610 | Silverman | Apr. 14, 1953 |
| 2,638,001 | Zenor | May 12, 1953 |
| 2,657,581 | Fay | Nov. 3, 1953 |
| 2,674,886 | Evans | Apr. 13, 1954 |
| 2,720,663 | Bloomfield | Oct. 18, 1955 |
| 2,805,572 | Carruthers | Sept. 10, 1957 |

FOREIGN PATENTS

| | | |
|---|---|---|
| 571,613 | Great Britain | Aug. 31, 1945 |